United States Patent
Islam et al.

(10) Patent No.: US 7,646,753 B2
(45) Date of Patent: Jan. 12, 2010

(54) MOBILE IP REGISTRATION PROCESS FOR ALWAYS-ON DEVICE

(75) Inventors: M. Khaledul Islam, Ottawa (CA); Jin Kim, Ottawa (CA); Shahid R. Chaudry, Kanata (CA)

(73) Assignee: Research In Motion Limited, Waterloo, Ontario (CA)

( * ) Notice: Subject to any disclaimer, the term of this patent is extended or adjusted under 35 U.S.C. 154(b) by 431 days.

(21) Appl. No.: 11/030,917

(22) Filed: Jan. 10, 2005

(65) Prior Publication Data

US 2006/0153063 A1    Jul. 13, 2006

(51) Int. Cl.
*H04J 1/16* (2006.01)

(52) U.S. Cl. .............. 370/338; 370/328; 370/329; 370/252; 370/331; 455/435.1

(58) Field of Classification Search .......... 370/329, 370/328, 252, 216, 331
See application file for complete search history.

(56) References Cited

U.S. PATENT DOCUMENTS

| | | | |
|---|---|---|---|
| 6,735,202 B1 * | 5/2004 | Ahmed et al. | 370/392 |
| 6,904,033 B1 * | 6/2005 | Perras et al. | 370/338 |
| 2002/0067704 A1 * | 6/2002 | Ton | 370/329 |
| 2003/0224788 A1 * | 12/2003 | Leung et al. | 455/435.1 |
| 2004/0103171 A1 * | 5/2004 | Mullis et al. | 709/221 |
| 2004/0174876 A1 * | 9/2004 | Peirce et al. | 370/389 |
| 2004/0243882 A1 * | 12/2004 | Zhou | 714/38 |
| 2005/0094599 A1 * | 5/2005 | Ryu et al. | 370/331 |
| 2006/0002397 A1 * | 1/2006 | Xue et al. | 370/395.2 |

FOREIGN PATENT DOCUMENTS

WO    WO 2004/049664    10/2004

OTHER PUBLICATIONS

Pat R Calhoun Airespace Tony Johansson Bytemobile Inc Charles E Perkins Nokia Research Center Tom Hiller Peter J McCann Lucent Tec: "Diameter Mobile Ipv4 Application" IETF Standard-Working-Draft, Internet Engineering Task Force, IETF, CH, vol. aaa, No. 20, Aug. 2004, XP015015005 ISSN: 0000-0004 *abstract* section 1.2 section 6.1.
Perkins-Nokia Research Center C: "IP mobility support for IPV4" IETF Standard, Internet Engineering Task Force, IETF, CH, Aug. 2002, XP015009105 ISSN: 0000-0003 *abstract* section 1.5 section 3.

* cited by examiner

*Primary Examiner*—Rafael Pérez-Gutiérrez
*Assistant Examiner*—Nimesh Patel

(57) ABSTRACT

A system and method for an automatic retry method during initial registration and re-registration of a mobile device on a mobile Internet Protocol (MIP) network is provided. The mobile device is adapted to categorise a registration response (RRP) code and accordingly determine a course of action. By reacting intelligently to the RRP code category, the mobile device is able to maintain a point to point protocol (PPP) connectivity and achieve "always-on" status.

13 Claims, 8 Drawing Sheets

| Type of Error | IANA RRP Code | Originator of RRP Code | Description of Error |
|---|---|---|---|
| Temporary Out-of-sync issues | 104 | FA | Unknown Challenge |
| | 105 | FA | Missing Challenge (If MN does not include FA challenge ext or challenge value when it is required) |
| | 106 | FA | Stale Challenge (If FA receives RRQ with same Id and FA challenge and it has forwarded RRQ to HA) |
| | 133 | HA | Registration Identification mismatch |

FIG. 6A

| Type of Error | IANA RRP Code | Originator of RRP Code | Description of Error |
|---|---|---|---|
| | 67 | FA | Mobile node failed authentication |
| | 68 | FA | HA-FA authentication failure |
| | 80 | FA | Home network unreachable (ICMP error received) |
| | 81 | FA | HA host unreachable (ICMP error received) |
| | 82 | FA | HA port unreachable (ICMP error received) |
| | 88 | FA | HA unreachable (other ICMP error received) |
| Provisioning Issues | 96 | FA | nonzero home addr reqd |
| | 97 | FA | missing NAI |
| | 98 | FA | missing homeagent |
| | 99 | FA | missing homeaddr |
| | 131 | HA | mobile node failed authentication |
| | 132 | HA | FA failed authentication |
| | 136 | HA | unknown HA address |

| Type of Error | IANA RRP Code | Originator of RRP Code | Description of Error |
|---|---|---|---|
| | 66 | FA | Insufficient resources |
| | 64 | FA | Reason unspecified |
| | 65 | FA | Administratively prohibited |
| | 69 | FA | requested Lifetime too long |
| | 70 | FA | poorly formed Request |
| | 71 | FA | poorly formed Reply |
| | 72 | FA | requested encapsulation unavailable |
| | 73 | FA | reserved and unavailable |
| | 74 | FA | request reverse tunnel unavailable |
| | 76 | FA | mobile node too distant |
| | 77 | FA | invalid care-of address |
| | 78 | FA | registration timeout |
| | 79 | FA | delivery style not supported |
| | 100 | FA | ERROR-FA-1 |
| | 101 | FA | ERROR-FA-2 |
| | 128 | HA | reason unspecified |
| | 129 | HA | administratively prohibited |
| | 130 | HA | insufficient resources |
| | 133 | HA | registration Identification mismatch |
| | 134 | HA | poorly formed Request |
| | 135 | HA | too many simultaneous mobility bindings |
| | 137 | HA | request reverse tunnel unavailable |
| | 138 | HA | reverse tunnel is mandatory and 'T' bit not set |
| | 139 | HA | requested encapsulation unavailable |
| Temporary Network Error | 140 | HA | ERROR-HA-1 |
| | 141 | HA | ERROR-HA-2 |
| | 142 | HA | ERROR_HA_UDP-ENCAP_UNAVAIL |

MOBILE IP REGISTRATION PROCESS FOR ALWAYS-ON DEVICE

FIELD OF THE APPLICATION

The application relates to the provision of IP (Internet Protocol) connectivity for wireless devices, and in particular to registering wireless devices on a MIP (Mobile IP) network.

BACKGROUND

MIP (Mobile IP) is a protocol that was originally proposed by the IETF (Internet Engineering Task Force) and is described in "RFC 2002—IP Mobility Support". In a MIP network, a HA (home agent) typically assigns a static home IP address to each associated mobile device. As a mobile device roams in the MIP network, it registers with a FA (foreign agent), which provides a COA (care-of-address). The HA is informed of the mobile device's COA through the registration procedure. The FA maintains a binding of the home IP address to COA for a certain length of time called a registration lifetime. A tunnel is established between the HA and the mobile device enabling the HA to send packets to the mobile device by means of the FA; therefore, the mobile device is reachable via its home IP address. As long as the mobile device re-registers before the registration lifetime expires, a PPP (point to point protocol) connectivity is maintained.

In a SIP (Simple IP) network, mobile devices are assigned geographically dependent IP addresses dynamically by a visited PDSN (Packet Data Serving Nodes). As the mobile device roams it will be assigned a new geographically dependent IP address for a duration that may not be known to the mobile device. MIP provides a number of advantages over SIP (Simple IP) such as enabling communication with the mobile device using its non-geographically dependent home IP address. The elimination of the need to know the mobile device's current geographical point of attachment greatly enhances roaming capabilities and enables different application servers to reach the mobile device via its known home IP address regardless of its current point of attachment to the MIP network. Also, MIP enables multiple user profiles with different user ID/password etc.

A mobile device that is configured as "Mobile IP only" may encounter a number of registration issues in a network—both in home and in roaming. If such situations are not handled properly, then it may lead to disruption in data connectivity resulting in a poor user experience in case of an "always-on" mobile device. On the other hand, brute force retry attempts by the mobile device to re-register with the MIP network can cause unwarranted MIP network access, a reduced battery life of the mobile device, and congestion of the MIP network.

SUMMARY OF THE APPLICATION

According to one broad aspect, the application provides a method in a wireless device comprising: a) initialising for MIP (Mobile Internet Protocol) registration; b) sending a MIP registration request; for each error category of a plurality of error categories, upon failure to establish a MIP session due to an error in that error category, executing automatically at least one respective error category specific step; wherein for at least one of the error categories, the at least one respective error category specific step comprises returning automatically to step a); and wherein for at least one of the error categories, the at least one respective error category specific step comprises returning automatically to step b).

In some embodiments, the method comprises: for at least one of the error categories, returning to step a) for some conditions and to step b) for other conditions.

In some embodiments, for at least one of the error categories, the at least one respective error category specific step comprises returning automatically to step a) after a first back-off time; and wherein for at least one of the error categories, the at least one respective error category specific step comprises returning automatically to step b) after a second back-off time.

In some embodiments, the plurality of error categories comprises no registration response, out-of-sync errors, provisioning errors, and temporary network errors.

In some embodiments, the method further comprises: defining at least two groups of RRP codes, each group of RRP codes defining an error category of said plurality of error categories; receiving an RRP code in response to a failed registration attempt and determining the error category using the RRP code.

In some embodiments, initialising for MIP registration is performed upon expiry of a MIP registration lifetime and when the wireless device moves to a new MIP network.

In some embodiments, initialising for MIP registration is performed when the wireless device is powered on and when the wireless device switches to a new user profile.

In some embodiments, the method further comprises: defining at least two user profiles on the wireless device one of which is an active user profile at a given time; wherein for at least one error category, the respective at least one error category specific is defined differently for each of the at least two user profiles.

In some embodiments, each user profile is a NAI (network access identifier) profile.

In some embodiments, the method further comprises: defining at least one user profile on the wireless device one of which is an active user profile at a given time; maintaining a retry history for each user profile, the retry history comprising an identification of networks that have not allowed registration; and for at least one error category, executing the at least one respective error category specific step as a function of the retry history of the active user profile and the active user profile itself.

In some embodiments, for no registration response, the at least one error category specific step comprises re-sending a registration request; for out-of-sync errors the at least one error category specific step comprises: a) requesting a challenge if a current challenge is unknown, missing, or stale, and then re-sending a registration request; or b) adjusting a time stamp if there is a registration identification mismatch, and then re-sending the registration request; for temporary network errors the at least one error category specific step comprises: a) sending the registration request with a lifetime of zero if a prior MIP session exists; b) freeing up resources used in the attempt to register the wireless device with the network, and then re-attempting to register the wireless device; and for provisioning errors the at least one error category specific step comprises: a) sending the registration request with a lifetime of zero if a prior MIP session exists; b) freeing up resources used in the attempt to register the wireless device with the network; c) adding the network to a list of networks not allowing packet data access, then waiting to acquire a network not found on the list, and then retrying the method of registering the wireless device.

According to another broad aspect, the application provides a method in a wireless device comprising: attempting to register with a MIP network; executing at least one error category specific step if no response to the registration attempt is received; executing at least one error category specific step for at least one category of error codes selected from a group consisting of out-of-sync error codes, provisioning error codes, temporary network error codes upon receipt of an error code belonging to one of the at least one category.

In some embodiments, the at least one category comprises out of sync error codes, provisioning error codes, and temporary network failure error codes.

In some embodiments, attempting to register with the MIP network occurs upon expiry of a MIP registration lifetime and when the wireless device moves to a new network.

In some embodiments, attempting to register with the MIP network occurs when the wireless device is powered on and when the wireless device switches to a new user profile.

In some embodiments, the method further comprises: defining at least one user profile on the wireless device, one of which is an active user profile at a given time; maintaining a retry history for each user profile, the retry history comprising an identification of networks that have not allowed registration; and for at least one category of error selected from a group consisting of no registration response, out-of-sync errors, provisioning errors, and temporary network errors, executing at least one step as a function of the retry history of the active user profile and the active user profile itself.

In some embodiments, executing at least one step if no response to the registration attempt is received comprise transmitting multiple RRQMs (registration request message) each separated by a first back-off time.

In some embodiments, executing at least one step if no response to the registration attempt is received further comprises: after transmitting the multiple RRQM without success: waiting a second backoff time; and transmitting a further multiple RRQMs each separated by the first back-off time.

In some embodiments, for out-of-sync errors the executing at least one error category specific step comprises: a) requesting a challenge if a current challenge is unknown, missing, or stale, and then re-sending a registration request; or b) adjusting a time stamp if there is a registration identification mismatch, and then re-sending the registration request; for temporary network errors the executing at least one error category specific step comprises: c) sending the registration request with a lifetime of zero if a prior MIP session exists; d) freeing up resources used in the attempt to register the wireless device with the network, and then re-attempting to register the wireless device; and for provisioning errors the executing at least one error category specific step comprises: e) sending the registration request with a lifetime of zero if a prior MIP session exists; f) freeing up resources used in the attempt to register the wireless device with the network; g) adding the network to a list of networks not allowing packet data access, then waiting to acquire a network not found on the list, and then retrying the method of registering the wireless device.

In another embodiment, a wireless device is provided that is adapted to implement one of the methods summarized above.

In another embodiment, a computer readable medium having computer executable instructions stored thereon is provided for execution on a wireless device so as to implement one of the methods as summarized above.

BRIEF DESCRIPTION OF THE DRAWINGS

Preferred embodiments will now be described with reference to the attached drawings in which:

FIG. 6 is a chart providing example RRP (registration reply) code categories in accordance with an embodiment of the application.

DETAILED DESCRIPTION OF THE PREFERRED EMBODIMENTS

Figure 1:
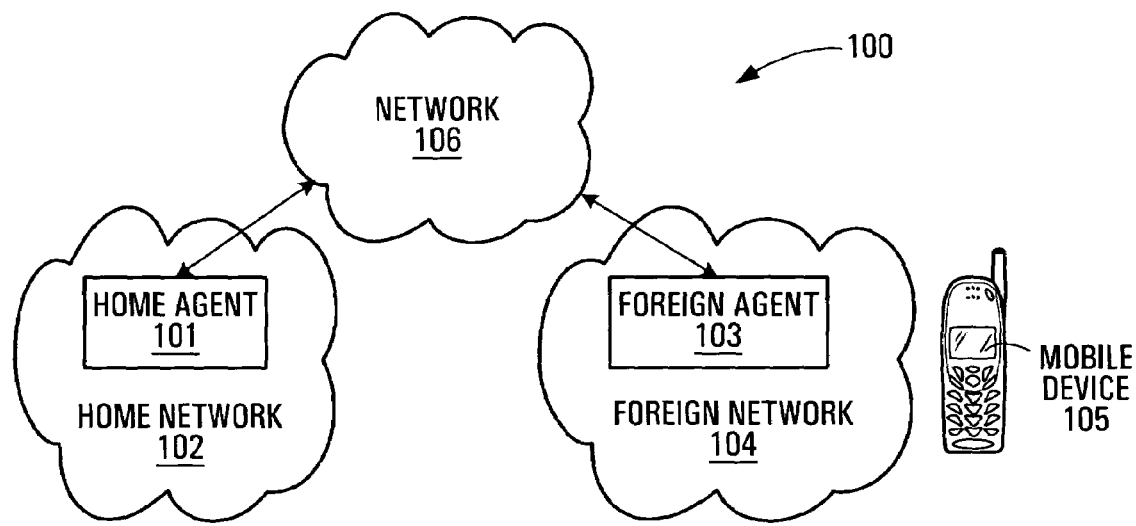
FIG. 1 is a schematic of an example MIP (Mobile IP) network.

Referring now to FIG. 1, a schematic of an example MIP (Mobile IP) network 100 is shown. The MIP network 100 has an HA (home agent) 101 coupled with a home network 102, and an FA (foreign agent) 103 coupled with a foreign network 104. The home agent 101 is coupled with the foreign agent 103 through one or more networks 106. Although it is not shown in the drawing, a plurality of foreign networks 104 is typically present, each foreign network 104 having an associated FA 103 (not shown). A mobile device 105 is drawn near the foreign network 104 as to represent that it is visiting the foreign network 104. A plurality of mobile devices is typically present (not shown).

In operation, the mobile device 105 uses two IP addresses: a home IP address and a COA (care-of address). MIP session establishment involves agent discovery, registration with the FA 103 using the COA, and tunnelling establishment between the HA 101 and the FA 103. The home IP address is typically static once it is provisioned and is managed by the HA 101. The COA is maintained by the FA 103 and represents the point of attachment to the foreign network 104. The COA dynamically changes as the mobile device 105 roams among different foreign networks 104. The FA 103 notifies the home agent 101 of the COA so that the mobile device 105 is reachable with its home IP address by means of tunnelling.

As part of the agent discovery process, the FA 103 sends an ICMP (Internet Control Message Protocol) AAM (agent advertisement message) to the mobile device 105. The AAM has a MIP agent advertisement extension and may also comprise an FA challenge extension, which is used for authentication. The MIP agent advertisement extension includes one or more COAs, a registration lifetime, and a plurality of feature sets supported by the FA 103 (e.g. reverse tunnelling support by the FA 103). After the mobile device 105 receives the information about the FA 103 capability, it sends a MIP RRQM (registration request message) to the FA 103. The RRQM is a RRQ (registration request) and contains the home IP address, an IP address of the HA 101, a requested COA, and a number of parameters related to authentication. The RRQM may also contain indications, typically during initial provisioning, that the home IP address and an IP address of the HA are not assigned yet. After initial authentication, the FA 103 forwards this information to the HA 101 through the network 106. Once the mobile device 105 is authenticated successfully, the HA 101 sends a RRPM (registration response message) to the mobile device 105 via the FA 103 indicating whether or not registration is successful. If the FA 103 or the HA 101 decide not to accept the registration request, then the reason why is indicated by a RRP (registration reply) code contained in the RRPM.

In some embodiments, a CDMA (Code-Division Multiple Access) technology is used as the wireless network connected to the MIP network 100. However, the employment of other technologies is possible and is within the scope of this application.

Automatic Retry Method

Figure 2:
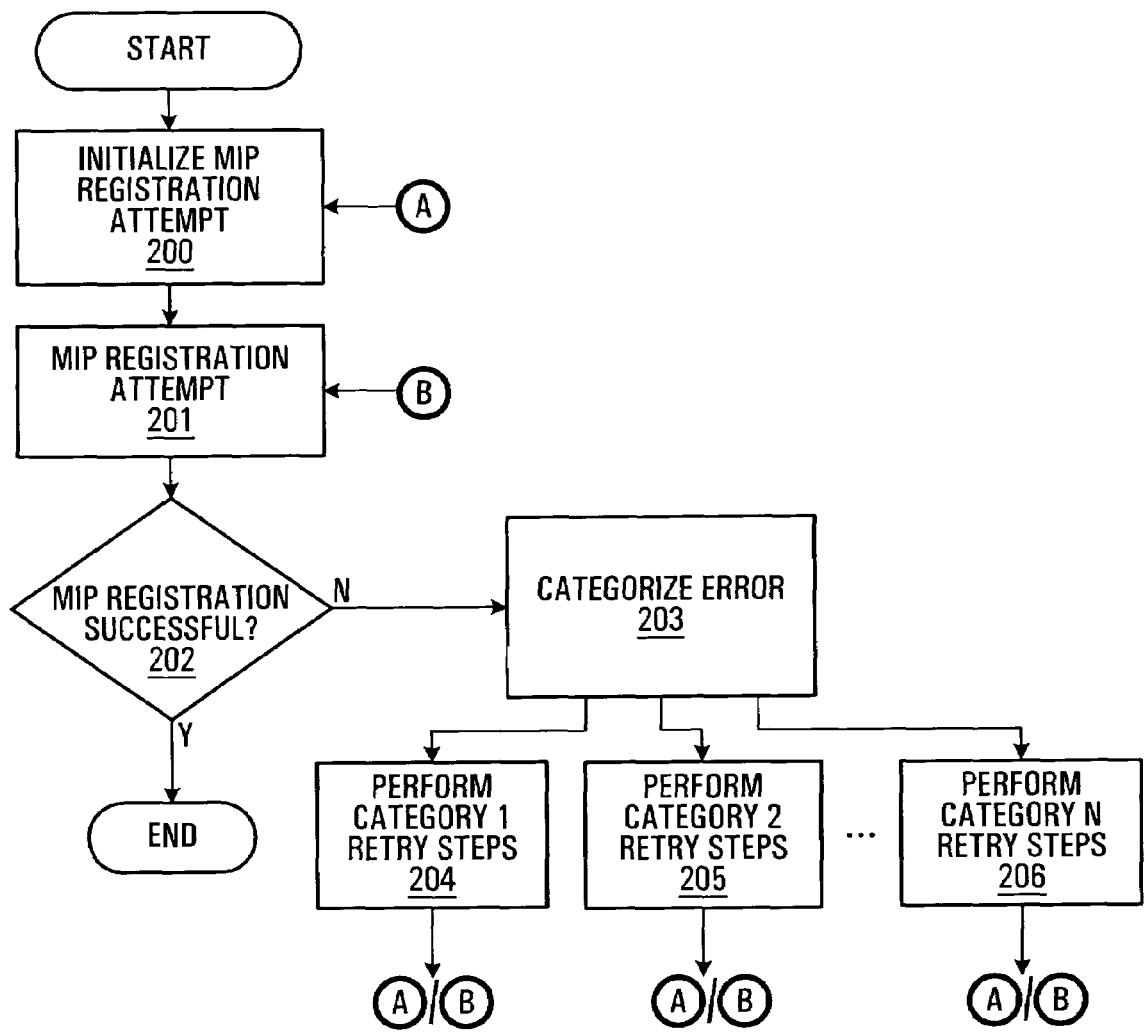
FIG. 2 is a flow chart of a method of registering a mobile device on a MIP network in accordance with an embodiment of the application.

Turning now to FIG. 2, a flow chart of a method of registering the mobile device 105 on the MIP network 100 in accordance with an embodiment of the application is shown. The mobile device 105 performs initialisations at step 200 in preparation for registering with the MIP network 100. Next, the mobile device 105 attempts to register with the MIP network 100 at step 201. A successful registration is typically acknowledged in some manner. If registration is successful at step 202, then the method ends. However, it is possible that registration will be unsuccessful, which may be indicated by receiving a reply message indicating unsuccessful registration or by not receiving any reply message at all. If registration is unsuccessful at step 202, then the method categorises the error at step 203. The absence of a reply message and receipt of a reply message indicating unsuccessful registration are both examples of error categories for unsuccessful registration.

In general, a plurality of error categories is possible. FIG. 2 illustrates N categories represented by steps 204, 205, and 206. In each of steps 204, 205, and 206, actions are performed that are specific to the error category. These actions are preferably executed automatically without any input from a user. After completing these actions, the method continues. The particulars of how the method continues are application specific. For example, for some error categories, the method might continue by returning to A meaning initialisation is performed. For other error categories, the method might continue by returning to B meaning a new registration attempt is made without re-initialising. More generally, the method might continue to A for some conditions and continue to B for other conditions. In some embodiments, for at least one error category the method continues by returning A and for at least one other error category the method continues by returning B.

In some embodiments, a first backoff time is implemented before returning to B and a second backoff time is implemented before returning to A, the second backoff time being longer than the first backoff time. In a particular example, one error category of the method is defined to be the absence of any response whatsoever to the MIP registration attempt. This method continues at B, with the first backoff time being implemented between each MIP registration attempt. If a pre-configured number of failed attempts have been experienced for this particular error category, then the method continues at A after the second backoff time. In another particular example, one error category of the method relates to out-of-sync errors indicated by received error codes. When such an error occurs, the method returns to A after waiting the second backoff time. However, under certain conditions, the method may return to B after the first backoff time.

Error Category Specific Actions

Figure 3:
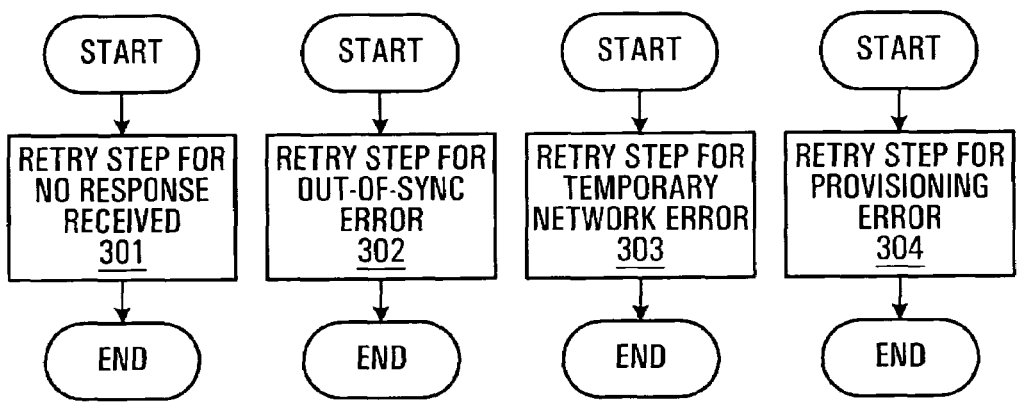
FIG. 3 is a plurality of flow charts providing example error category specific actions in accordance with an embodiment of the application.

Turning now to FIG. 3, another overall retry method is illustrated in the form of a plurality of flow charts providing example error category specific actions in accordance with an embodiment of the application. In operation, the mobile device 105 sends a RRQM in order to register with the MIP network 100. If the mobile device 105 receives a RRPM indicating that registration is successful, then the mobile device 105 is registered for duration of the registration lifetime. At step 301, actions are executed if no response whatsoever is received by the mobile device 105.

Steps 302, 303, and 304 indicate other example error category specific actions. At step 302, actions are executed when a RRPM is received indicating an out-of-sync error. At step 303, actions are executed when a response is received indicating a temporary network error. At step 304, actions are executed when a response is received indicating a provisioning error. In one embodiment, the error category specific actions of steps 301, 302, 303, and 304 are all implemented. In another embodiment, the error category specific actions of steps 301 together with at least one of steps 302, 303, and 304 are implemented.

Further details of these example error category specific actions are provided later with the aid of FIG. 4 and FIG. 5.

User Profiles

In some embodiments, each mobile device 105 supports a plurality of user profiles. An example of a user profile is an NAI (network access identifier), each NAI profile comprising a userID, a password, and a shared secret. The mobile device 105 can switch between several NAI profiles, but preferably only one NAI profile is active at a given time.

In some embodiments, a retry history is maintained for each NAI profile. The retry history contains, for example, a list of networks that do not allow a MIP session to be established. For example, if the mobile device 105 with an active NAI profile "x" is not able to establish a MIP session, then the mobile device 105 will record on the list that the network does not allow the NAI profile "x" to establish a MIP session. If a particular NAI profile is re-provisioned, then all of its associated retry history is erased. Examples of re-provisioning include explicit user-initiated provisioning attempts, or network-initiated provisioning attempts such as IOTA (Internet over the air).

In some embodiments, the retry method executed by the mobile device 105 is a function of the active NAI profile and/or the retry history associated with the NAI profile. Different retry methods can be configured for each profile. Then, when a given RRP code is received, the retry method that is executed is the one for the received RRP code and the active profile and/or retry history.

Automatic Retry Method for Initial Registration

Figure 4:
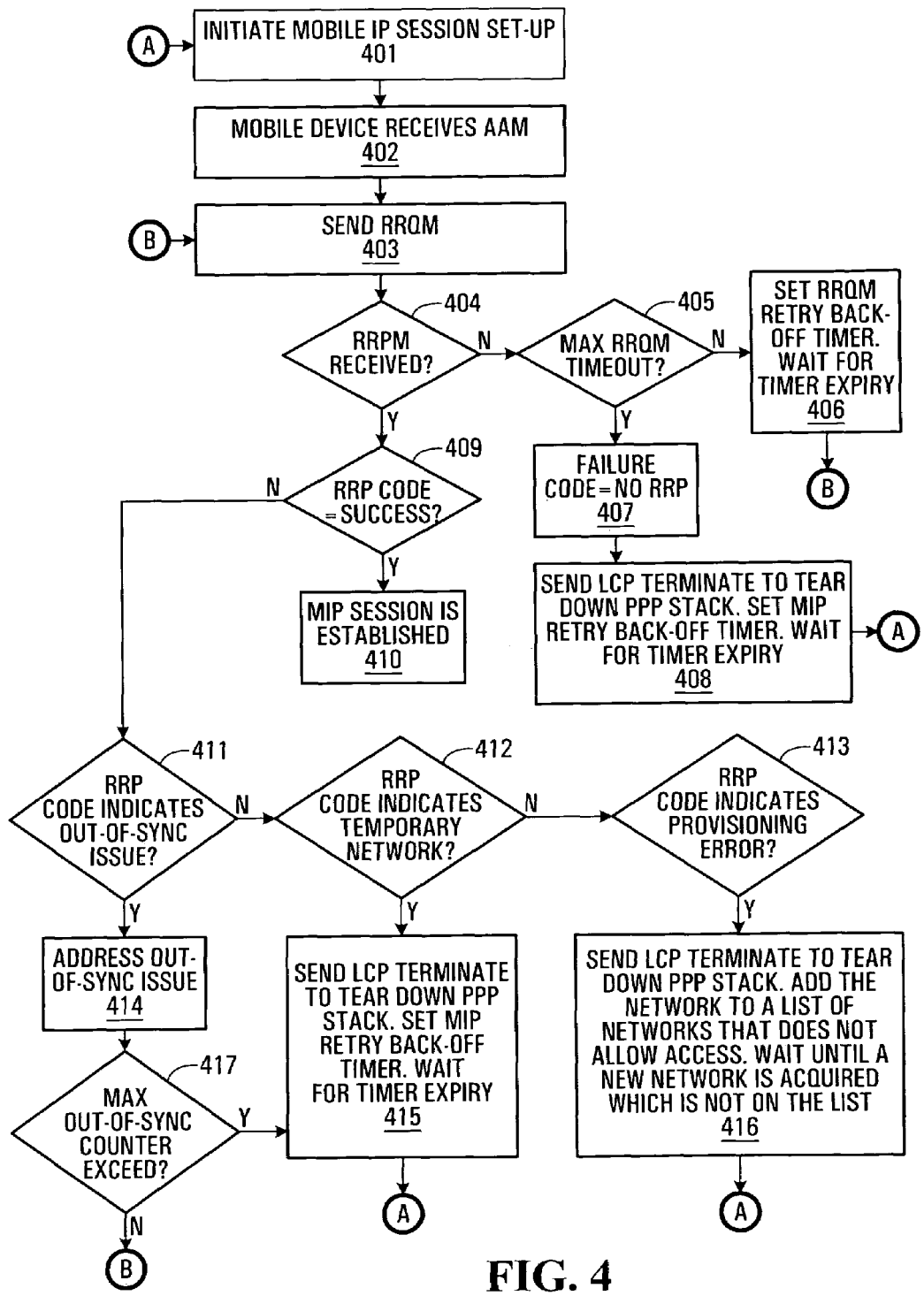
FIG. 4 is a flow chart of a method of initially registering a mobile device on a MIP network in accordance with an embodiment of the application.

Turning now to FIG. 4, a flow chart of a method of initially registering the mobile device 105 on the MIP network 100 in accordance with an embodiment of the application is shown. Initial registration is performed in order to establish a PPP session for the mobile device 105. In order to maintain "always-on" status, the mobile device 105 preferably triggers initial registration automatically for example whenever it is powered on or switches to another NAI profile. The method begins at step 401 when the MIP session set-up is initiated. At step 402, the mobile device 105 is informed of the FA 103 capability by receiving the AAM from the FA 103. Using this information, the mobile device 105 requests registration by sending the RRQM to the FA 103 at step 403. At step 404, the mobile device 105 attempts to receive the RRPM from the FA 103. If the RRPM is not received, then the mobile device 105 will determine whether or not it should re-send the RRQM by determining whether or not a maximum RRQM timeout has been reached. If the maximum RRQM timeout has not been reached, then the mobile device 105 will re-send the RRQM after a time delay. At step 406, the mobile device 105 sets a RRQM retry back-off timer and waits for it to expire before the mobile device 105 re-sends the RRQM at step 403. However, if the maximum RRQM timeout has been reached at step 405, then the mobile device 105 sets a failure code at step 407 and proceeds to step 408. At step 408, the mobile device 105 makes preparations to retry MIP initial registration from the beginning after a time delay. The mobile device 105 tears down the PPP stack with a LCP terminate message in order to free up resources, sets a MIP retry back-off timer, and waits for the MIP retry back-off timer to expire. Once the MIP retry back-off timer has expired, MIP initial registration is re-attempted by looping back to step 401.

If the mobile device 105 receives the RRPM in step 404, then the mobile device 105 determines whether or not the RRP code contained in the RRPM indicates that MIP initial registration is successful at step 409. If the MIP session is successfully established, then the method ends at step 410 and the mobile device 105 is registered for duration given by the registration lifetime. The mobile device 105 stores the registration lifetime, which is used to trigger re-registration. If the MIP initial registration is not successful, then the mobile device 105 executes a course of action based on the received RRP code starting at step 411.

If the mobile device 105 determines from the RRP code that there is an out-of-sync issue at step 411, then the out-of-sync issue is addressed at step 414. The mobile device 105 determines whether or not it has experienced the out-of-sync issue too many times by determining whether or not a max out-of-sync counter has been exceeded at step 417. If the max out-of-sync counter has not been exceeded then the mobile device 105 will re-send the RRQM at step 403. Otherwise, the mobile device 105 makes preparations to retry initial registration from the beginning after a time delay. At step 415, the mobile device 105 tears down the PPP stack with the LCP terminate message, sets the MIP retry back-off timer, and waits for the MIP retry back-off timer to expire. Once the MIP retry back-off timer has expired, MIP initial registration is re-attempted by looping back to step 401.

If there is not an out-of-sync issue, then the mobile device 105 determines at step 412 whether or not the RRP code indicates a temporary network error. If there is a temporary network error, then the mobile device 105 makes preparations to retry initial registration from the beginning after a time delay at step 415, which has already been discussed.

If there is not a temporary network error, then the mobile device 105 determines at step 413 whether or not the RRP code indicates a provisioning error. If there is a provisioning error, then the mobile device 105 makes preparations to retry initial registration from the beginning. At step 416, the mobile device 105 tears down the PPP stack with the LCP terminate message, records on a list the network that does not allow access, and waits until a new network not found on the list is acquired. Once step 416 is completed, MIP initial registration is re-attempted by looping back to step 401.

In some embodiments, the RRP code is analysed against a different set of error categories than is implemented in steps 411, 412 and 413. The method is scalable to amend or add error categories. More generally, the retry method operates as a function of the received RRP code. Preferably, the retry method is performed automatically without input from a user. It is to be understood that FIG. 4 is a specific embodiment while numerous other embodiments are possible. Specific details of preferred error categories are discussed later with the aid of FIG. 6.

Automatic Retry Method for Re-Registration

Figure 5:
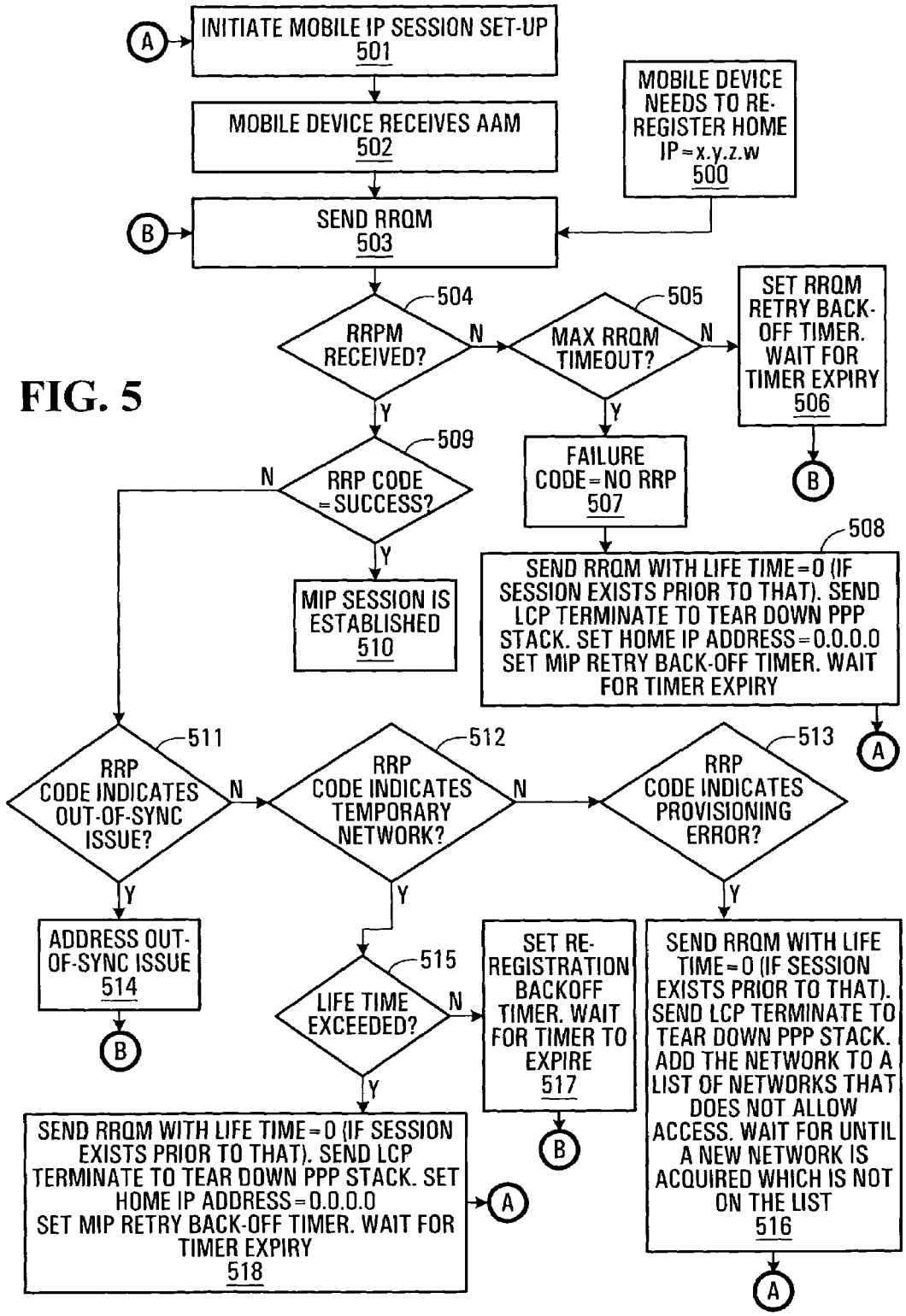
FIG. 5 is a flow chart of a method of re-registering a mobile device on a MIP network in accordance with an embodiment of the application.

Turning now to FIG. 5, a flow chart of a method of re-registering the mobile device 105 on the MIP network 100 in accordance with an embodiment of the application is shown. In this case, the mobile device 105 has an existing PPP session with as assigned home IP address (x.y.z.w). The mobile device 105 automatically re-registers its home IP address (x.y.z.w) prior to the expiration of the registration lifetime starting at step 500. At step 503, the mobile device 105 requests re-registration of its home IP address (x.y.z.w) by sending the RRQM. In a typical scenario, an RRP code is received at step 504 and indicates at step 509 that the MIP re-registration is successful and the mobile device 105 is re-registered at step 510 for another registration lifetime.

Steps 501 through 507 and steps 509 through 513 in FIG. 5 are substantially identical to steps 401 through 407 and steps 409 through 413, respectively. Therefore, details of these steps are not discussed here. Other steps relate to the retry method of the mobile device 105 in the event that that an RRP code indicating successful MIP re-registration isn't received. The retry method of mobile device 105 is preferably different for re-registration than initial registration.

If the mobile device 105 experiences the max RRQM timeout when waiting for the RRPM, then it makes preparations to retry MIP re-registration at step 501 after a time delay. If a MIP session exists upon entering step 508, then at step 508 the mobile device 105 sends an RRQ code with a lifetime of zero in order to terminate the MIP session. The mobile device 105 then tears down the PPP stack with a LCP terminate message in order to free up resources, resets its home IP address to 0.0.0.0, sets the MIP retry back-off timer, and waits for the MIP retry back-off timer to expire. Once the MIP retry back-off timer has expired, MIP re-registration is re-attempted by looping back to step 501. After completing steps 501 and 502, the mobile device 105 at step 503 will send an RRQM containing the reset home IP address of 0.0.0.0 so that the HA 101 understands that the mobile device 105 has lost its home IP address.

If the received RRP code indicates an out-of-sync issue at step 511, then the out-of-sync issue is handled at step 514. Once the out-of-sync issue has been addressed, the mobile device 105 resends the RRQM in order to retry home IP address (x.y.z.w) re-registration by looping back to step 503.

If the received RRP code indicates a temporary network error at step 512, then the mobile device 105 determines whether or not re-registration should be retried from step 501 or 503. If the mobile device 105 determines that the registration lifetime has not been exceeded at step 515, then it will re-send the RRQM at step 503 after a time delay given by the re-registration back-off timer. However, if the registration lifetime has been exceeded, then the mobile device 105 makes preparations at step 518 to retry re-registration at step 501. The mobile device 105 performs actions in step 518 that are substantially identical to the actions in step 508. As details of step 508 have already been discussed, details of step 518 are not discussed here. After step 518, MIP re-registration is re-attempted by looping back to step 501.

If the received RRP code indicates a provisioning error, then the mobile device 105 makes preparations at step 516 to retry re-registration at step 501. If a MIP session exists upon entering step 516, then the mobile device 105 sends an RRQ code with a lifetime of zero in order to terminate the MIP session. The mobile device 105 then tears down the PPP stack with the LCP terminate message, records on a list the network that does not allow access, and waits until a new network not found on the list is acquired. Next, MIP re-registration is re-attempted by looping back to step 501

In some embodiments, the RRP code is analysed against a different set of error categories than is implemented in steps 511, 512 and 513. The method is scalable to amend or add error categories. More generally, the retry method operates as a function of the received RRP code. Preferably, the retry method is performed automatically without input from a user. It is to be understood that FIG. 5 is a specific embodiment while numerous other embodiments are possible. Specific details of preferred error categories are discussed with the aid of FIG. 6.

Error Categories

Turning now to FIG. 6, a chart providing example error categories in accordance with an embodiment of the application is shown. Preferably, each error is categorised by RRP code into three categories: temporary out-of-sync issues, temporary network errors, and provisioning issues. Categorisation of RRP codes according to these categories is seen in the methods of FIG. 3 and FIG. 4. If the method of FIG. 2 were to categorise error at step 203 according to RRP codes, then it might also include an additional category denoting that an RRP code is not received.

Each category of FIG. 6 contains at least one RRP code, each having a related description and an originator. The IANA (Internet Assignment Numbers Authority) provide the most up to date RRP codes at http://www.iana.org/assignments/mobileip-numbers.

It is to be understood that FIG. 6 is a very specific preferred embodiment for categorising RRP codes and that other embodiments are possible. Furthermore, the listing of RRP codes by the IANA is evolving and it is certainly possible that RRP codes will be amended, added, or removed. Therefore, it is to be understood that different embodiments of categorising RRP codes are possible especially as the IANA evolves the listing of RRP codes.

Mobile Device

Figure 7:
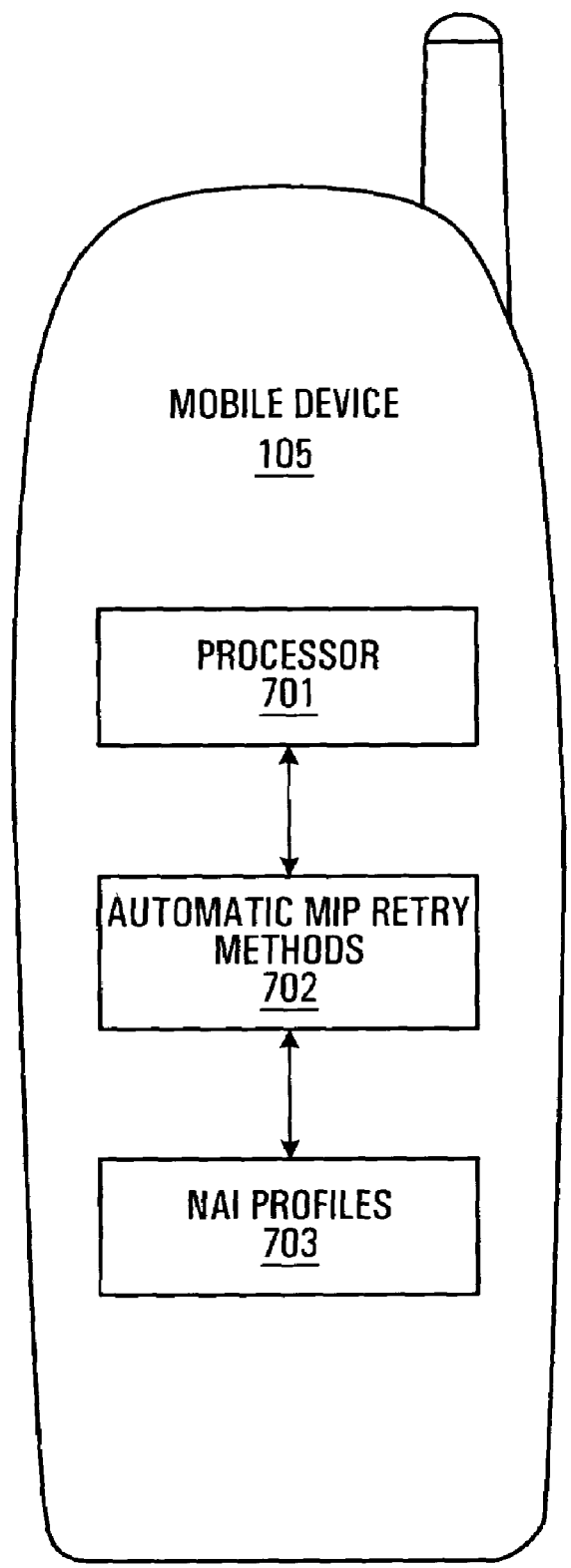
FIG. 7 is a block diagram of an example mobile device.

Turning now to FIG. 7, a block diagram of an example mobile device 105 is shown. The mobile device 105 has functionality implementing a plurality of automatic MIP retry methods 702 coupled to a processor 701 and at least one NAI profile 703.

In operation, the automatic MIP retry methods 702 utilise the processor 701 and NAI profile 703 in order to implement any of the methods described herein. Preferably, the automatic MIP retry methods 702 comprise a computer readable medium having computer executable instructions stored thereon for instructing the mobile device 105 to implement any of the methods described herein. In another embodiment, the automatic MIP retry methods 702 comprise any appropriate combination of hardware, software, or firmware that produces any of the methods described herein.

The embodiments described herein have focussed on automatic retry methods for registering the mobile device 105 on the MIP network 100. More generally, other embodiments are possible and relate to automatic retry methods for registering the mobile device 105 on other networks such as networks having a wireless protocol that deal with addressing for mobility using non-geographically dependant addressing. In such a network, the initial address may be geographically dependent, for example as assigned by a home agent, but as the mobile device 105 moves to new networks, the same address is maintained where possible.

Numerous modifications and variations of the present application are possible in light of the above teachings. It is therefore to be understood that within the scope of the appended claims, the application may be practiced otherwise than as specifically described herein.

The invention claimed is:

1. A method in a mobile wireless device comprising:
   a) initialising for MIP (Mobile Internet Protocol) registration;
   b) sending a MIP registration request;
   upon failure to establish a MIP session, categorizing the failure under an error category of a plurality of error categories, the plurality of error categories comprising: no response received and at least one of out-of-sync errors, provisioning errors, and temporary network errors; and
   for each error category of the plurality of error categories, upon failure to establish a MIP session due to an error in that error category, executing automatically at least one respective error category specific step;
   wherein for at least one of the error categories, the at least one respective error category specific step comprises returning automatically to step a); and
   wherein for at least one of the error categories, the at least one respective error category specific step comprises returning automatically to step b).

2. The method of claim 1 comprising:
   for at least one of the error categories, returning to step a) for some conditions and to step b) for other conditions.

3. The method of claim 1 wherein for at least one of the error categories, the at least one respective error category specific step comprises returning automatically to step a) after a first backoff time; and
   wherein for at least one of the error categories, the at least one respective error category specific step comprises returning automatically to step b) after a second backoff time.

4. The method of claim 1 wherein the plurality of error categories comprise no registration response, out-of-sync errors, provisioning errors, and temporary network errors.

5. The method of claim 4 further comprising:
   defining at least two groups of RRP codes, each group of RRP codes defining an error category of said plurality of error categories; and
   receiving an RRP code in response to a failed registration attempt;
   wherein the failure to establish a MIP session and categorizing the failure are determined based on the RRP code.

6. The method of claim 1 wherein initialising for MIP registration is performed upon expiry of a MIP registration lifetime and when the wireless device moves to a new MIP network.

7. The method of claim 1 wherein initialising for MIP registration is performed when the wireless device is powered on and when the wireless device switches to a new user profile.

8. The method of claim 1 further comprising:
   defining at least two user profiles on the wireless device one of which is an active user profile at a given time;
   wherein for at least one error category, the respective at least one error category specific is defined differently for each of the at least two user profiles.

9. The method of claim 8 wherein each user profile is a NAI (network access identifier) profile.

10. The method of claim 1 further comprising:
    defining at least one user profile on the wireless device one of which is an active user profile at a given time;

maintaining a retry history for each user profile, the retry history comprising an identification of networks that have not allowed registration; and for at least one error category, executing the at least one respective error category specific step as a function of the retry history of the active user profile and the active user profile itself.

11. The method of claim 4 wherein:

for no registration response, the at least one error category specific step comprise re-sending a registration request;

for out-of-sync errors the at least one error category specific step comprise:
a) requesting a challenge if a current challenge is unknown, missing, or stale, and then re-sending a registration request; or
b) adjusting a time stamp if there is a registration identification mismatch, and then re-sending the registration request;

for temporary network errors the at least one error category specific step comprise:
a) sending the registration request with a lifetime of zero if a prior MIP session exists;
b) freeing up resources used in the attempt to register the wireless device with the network, and then re-attempting to register the wireless device; and for provisioning errors the at least one error category specific step comprise:
a) sending the registration request with a lifetime of zero if a prior MIP session exists;
b) freeing up resources used in the attempt to register the wireless device with the network;
c) adding the network to a list of networks not allowing packet data access, then waiting to acquire a network not found on the list, and then retrying the method of registering the wireless device.

12. A wireless device adapted to implement the method of claim 1.

13. A computer readable medium having computer executable instructions stored thereon for execution on a wireless device so as to implement the method of claim 1.

* * * * *

UNITED STATES PATENT AND TRADEMARK OFFICE
CERTIFICATE OF CORRECTION

| | | |
|---|---|---|
| PATENT NO. | : 7,646,753 B2 | Page 1 of 1 |
| APPLICATION NO. | : 11/030917 | |
| DATED | : January 12, 2010 | |
| INVENTOR(S) | : M. Khaledul Islam et al. | |

It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 431 days.

should read (*) Notice: Subject to any disclaimer, the term of this patent is extended or adjusted under 35 U.S.C. 154(b) by 527 days.

Column 10, Claim 8, Line 59, "whieh" should be --which--.

Signed and Sealed this

Eighteenth Day of May, 2010

David J. Kappos
*Director of the United States Patent and Trademark Office*

UNITED STATES PATENT AND TRADEMARK OFFICE
CERTIFICATE OF CORRECTION

PATENT NO.       : 7,646,753 B2                                           Page 1 of 1
APPLICATION NO.  : 11/030917
DATED            : January 12, 2010
INVENTOR(S)      : Islam et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 612 days.

Signed and Sealed this

Twenty-eighth Day of December, 2010

David J. Kappos
*Director of the United States Patent and Trademark Office*